(12) United States Patent
Duncan et al.

(10) Patent No.: US 7,389,472 B2
(45) Date of Patent: Jun. 17, 2008

(54) CONNECTED TEMPLATES IN CONNECTION WITH A CONTENT MANAGEMENT SERVER SYSTEM OR THE LIKE

(75) Inventors: Nicholas Duncan, Redmond, WA (US); Kevin Ka-Wang Lui, Bellevue, WA (US); Patrick Carl Miller, Sammamish, WA (US); Mark Poernbacher, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 900 days.

(21) Appl. No.: 10/431,406

(22) Filed: May 7, 2003

(65) Prior Publication Data

US 2004/0225652 A1 Nov. 11, 2004

(51) Int. Cl.
*G06F 17/00* (2006.01)
(52) U.S. Cl. ...................................... 715/255
(58) Field of Classification Search ................ 715/500, 715/513, 530, 200, 234, 255
See application file for complete search history.

(56) References Cited

U.S. PATENT DOCUMENTS

| | | | | |
|---|---|---|---|---|
| 5,995,985 | A * | 11/1999 | Cai | 715/507 |
| 6,014,677 | A * | 1/2000 | Hayashi et al. | 707/104.1 |
| 6,456,738 | B1 * | 9/2002 | Tsukasa | 382/175 |
| 6,480,887 | B1 * | 11/2002 | Hayama | 709/217 |
| 6,499,041 | B1 * | 12/2002 | Breslau et al. | 715/505 |
| 6,574,634 | B2 * | 6/2003 | Woehl | 707/102 |
| 6,578,076 | B1 * | 6/2003 | Putzolu | 709/223 |
| 6,601,057 | B1 * | 7/2003 | Underwood et al. | 707/1 |
| 6,629,313 | B1 * | 9/2003 | Rowe et al. | 717/136 |
| 6,766,351 | B1 * | 7/2004 | Datla | 709/203 |
| 6,832,351 | B1 * | 12/2004 | Batres | 715/505 |
| 7,096,229 | B2 * | 8/2006 | Dettinger et al. | 707/102 |
| 2002/0091740 | A1 * | 7/2002 | Schantz | 707/530 |
| 2003/0014442 | A1 * | 1/2003 | Shiigi et al. | 707/513 |
| 2003/0041312 | A1 * | 2/2003 | Fueki | 717/100 |
| 2003/0212762 | A1 * | 11/2003 | Barnes et al. | 709/219 |
| 2004/0010755 | A1 * | 1/2004 | Hamada | 715/513 |
| 2004/0024643 | A1 * | 2/2004 | Pollock et al. | 705/16 |
| 2004/0039723 | A1 * | 2/2004 | Lee et al. | 707/1 |
| 2004/0051732 | A1 * | 3/2004 | White et al. | 345/736 |
| 2004/0088647 | A1 * | 5/2004 | Miller et al. | 715/500 |
| 2004/0099731 | A1 * | 5/2004 | Olenick et al. | 235/380 |

(Continued)

OTHER PUBLICATIONS

Riley, Data Abstraction and Structures Using C++, Copyright 1994 by D.C. Heath and Company, pp. 57-59.*

(Continued)

*Primary Examiner*—Cong-Lac Huynh
(74) *Attorney, Agent, or Firm*—Woodcock Washburn LLP

(57) ABSTRACT

A data system has a data structure with a posting corresponding to a set of pieces of content to be served. The posting includes a description of each piece of content including a name, a type, and a location thereof. The posting is presented to a user according to a pointed-to template. The template includes a placeholder within which each piece of content is to be presented, and positioning information setting forth a layout position for each placeholder. The template points to a separate content definition information module that includes content definition information for each placeholder including the name and type of the corresponding piece of content. Such name and type matches a corresponding name and type as set forth in the posting.

7 Claims, 4 Drawing Sheets

U.S. PATENT DOCUMENTS

| | | | |
|---|---|---|---|
| 2004/0199897 A1* | 10/2004 | Ghercioiu et al. | 717/101 |
| 2004/0205572 A1* | 10/2004 | Fields et al. | 715/513 |
| 2004/0210838 A1* | 10/2004 | Wason | 715/515 |
| 2004/0255233 A1* | 12/2004 | Croney et al. | 715/500 |
| 2005/0021611 A1* | 1/2005 | Knapp et al. | 709/203 |
| 2005/0039119 A1* | 2/2005 | Parks et al. | 715/515 |
| 2005/0131992 A1* | 6/2005 | Goldstein et al. | 709/202 |
| 2005/0132274 A1* | 6/2005 | Bodin et al. | 715/513 |
| 2005/0132275 A1* | 6/2005 | Bodin et al. | 715/513 |
| 2006/0041556 A1* | 2/2006 | Taniguchi et al. | 707/10 |

OTHER PUBLICATIONS

Riley et al., Data Abstraction and Structures Using C++, D.C. Heath and Company 1994, p. 98.*

* cited by examiner

Fig. 3 - PRIOR ART

CONNECTED TEMPLATES IN CONNECTION WITH A CONTENT MANAGEMENT SERVER SYSTEM OR THE LIKE

TECHNICAL FIELD

The present invention relates to a content management server system or the like that serves pages or the like based on connected templates. More specifically, the present invention relates to such content management server system or the like that employs multiple templates sharing a common content definition.

BACKGROUND OF THE INVENTION

As may be appreciated, a content management server (CMS) is employed by an enterprise or organization to build, deploy, and maintain a content-rich web site such as that which may be accessible by way of the Internet or another network. Such a CMS streamlines the web publishing process, thereby reducing costly site maintenance and empowering the enterprise or organization to manage its own content. An example of such a CMS is provided by the MICROSOFT Content Management Server application, as developed and marketed by MICROSOFT Corporation of Redmond, Wash., USA.

Thus, a CMS is employed to deploy an Internet, intranet, or extranet web site, and provides tools necessary to build and deploy the core infrastructure of a web site, including site structure, presentation templates, site design, application integration, and security. In addition, once a site has been deployed, managers and content authors can use CMS tools to create, publish, and manage their own content.

Typically, a CMS provides content managers, authors, and the like with tools that enable such personnel to create and publish rich, personalized content directly to a web site. A role-based distributed publishing model is typically employed, where such model incorporates an approval workflow with multiple levels, automatic content scheduling and archiving, and content indexing. Developers can create centrally-managed page templates and publishing processes that ensure consistency across the site, thus ensuring adherence to organizational publishing standards and branding without diminishing the flexibility of the publishing environment.

In a CMS, a template may be employed as the framework to control the way that a page of data is to be presented and manipulated. Typically, the template may include items such as content and/or one or more placeholders where content is to be placed, as well as positioning information on a layout for each item. Each placeholder typically includes some content definition information, including, for example, a name and a type of content to be placed in the placeholder, such as a picture, text, etc. Note that in some instances the template includes only the positioning information while a separate template gallery construct includes the content information and other information.

In such CMS or the like, a page of information or the like that can be served is typically represented by a posting that is locatable by way of a URL or other resource locator, where the posting typically points to and is therefore bound to a particular template. Put another away, the posting is 'viewed' according to the bound-to template. Typically, the posting points to content, whereby the served page of information includes at least a portion of the pointed-to content set forth according to the pointed-to template.

As may be appreciated, for each placeholder in the template as named according to the content definition thereof, the posting should refer to a correspondingly named piece of content. Thus, the 'title' placeholder is to be populated with 'title' content as specified within the posting and the 'title' content is of a type specified for the 'title' placeholder, the 'description' placeholder is to be populated with 'description' content as specified within the posting and the 'description' content is of a type specified for the 'description' placeholder, etc.

A need exists, however, for a method and mechanism that extends the aforementioned template-posting framework so that the content of the posting can be viewed according to multiple templates. That said, care must be taken to ensure that each of the multiple templates uses a common naming and typing scheme for naming and typing placeholders therein. That is, if a posting contains 'summary' content that is text and that is to appear in each view, then the template corresponding to each view must have a 'summary' placeholder of type text. If one of the templates instead has a 'sum' placeholder, for example, such template cannot handle the 'summary' content because of the name mismatch. Likewise, if one of the templates instead has a 'summary' placeholder of type picture, for example, such template cannot handle the 'summary' content because of the type mismatch.

More particularly, then, a need exists for a method and mechanism that connects templates based on a shared content definition for the placeholders of the templates. Accordingly, the same content as represented by the shared content definition can be viewed according to multiple connected templates that share such content definition. As a result, templates for displaying content become strongly typed but allow for considerable flexibility in formatting, filtering, and manipulating instances of content of the given type. Put another way, the same content can be re-purposed or represented in different ways.

SUMMARY OF THE INVENTION

The aforementioned needs are satisfied at least in part by the present invention in which a data system serves a set of pieces of content to a user. The data system has a data structure with a first posting corresponding to the set of pieces of content to be served. The first posting includes a description of each piece of content including a name of the piece of content, a type of the piece of content, and a location of the piece of content.

A first template is pointed to by the first posting, whereby the first posting is for being presented to the user according to the first template such that the set of pieces of content are to be viewed in a first manner. The first template includes a placeholder within which each piece of content is to be presented, and positioning information setting forth a layout position for each placeholder.

A content definition information (CDI) module is separate from but pointed to by the first template. The CDI module includes therein content definition information for each placeholder of the first template including the name and type of the piece of content corresponding to the placeholder. Such name and type of the piece of content matches a corresponding name and type of piece of content as set forth in the first posting.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
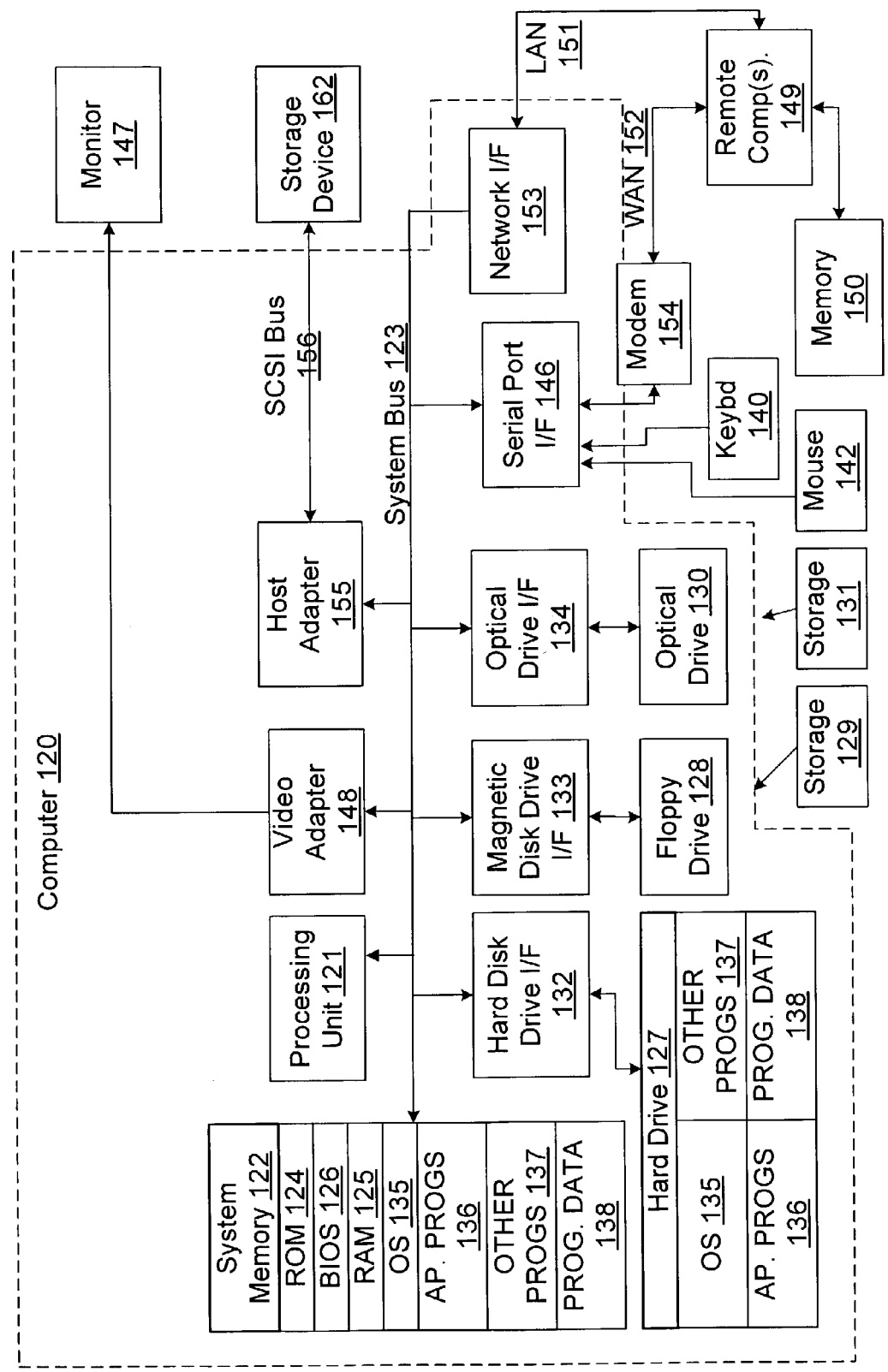
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, mini-computers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet. The personal computer 120 may also act as a host to a guest such as another personal computer 120, a more specialized device such as a portable player or portable data assistant, or the like, whereby the host downloads data to and/or uploads data from the guest, among other things.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Content Management Server System Overview

Figure 2:
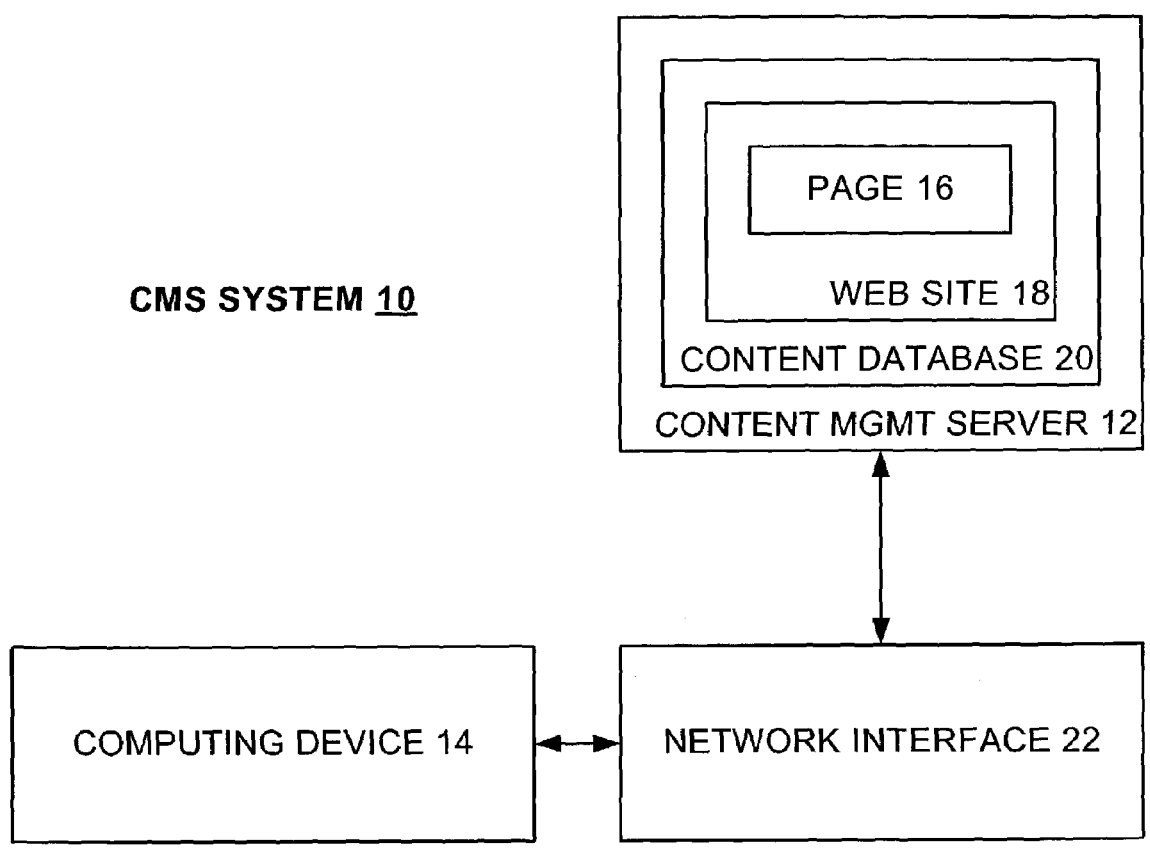
FIG. 2 is block diagram showing a content management server (CMS) system such as that which may be employed in connection with the present invention.

In one embodiment of the present invention, and turning now to FIG. 2, a Content Management Server (CMS) system 10 includes a CMS 12 and a plurality of users each at a client computing device 14 in operative communication with the CMS 12 by way of a network such as the Internet, an Intranet, or the like. Thus, each user at a computing device 14 can by way of an appropriate browser or the like thereon request a page 16 be served by the CMS 12.

The page 16 may have any content therein without departing from the spirit and scope of the present invention, although it is to be understood that the user is normally requesting the page 16 in the context of a web site 18 hosted by the CMS 12. For example, if the web site 18 is an electronic storefront, the page 16 may relate to an item available for sale thereat. Likewise, if the web site 18 is a support site, the page 16 may be a knowledge base article.

The computing device 14 may be any appropriate one without departing from the spirit and scope of the present invention, presuming that such computing device 14 and the browser thereon provides the functionality required by the user to in fact request page 16 and receive same for viewing by the user thereat. Notably, although the CMS 12 likely serves the page 16 in a format such as Hyper Text Markup Language (HTML) or eXtensible Markup Language (XML) or variations thereon, the CMS 12 need not necessarily produce the page 16 in such format.

The CMS 12 itself may be any appropriate CMS without departing from the spirit and scope of the present invention. For example, the CMS 12 may be a MICROSOFT CONTENT MANAGEMENT SERVER as developed and marketed by MICROSOFT Corporation of Redmond, Wash., USA. Inasmuch as the CMS 12 is known or should be apparent to the relevant public, such CMS 12 need not be described in detail herein except as set forth. Note that although the present invention of caching is disclosed primarily in terms of the CMS system 10 and CMS 12, the present invention may also be incorporated into any other type of caching system without departing from the spirit and scope of the present invention.

Typically, such CMS 12 includes a content database 20 within which is stored information on how to generate pages 16 or portions thereof to be served by such CMS 12 in the course of hosting the web site 18. Also typically, the CMS 12 works with a network interface 22 by which the CMS 12 receives requests for such pages 16 from users at computing devices 14 and returns such pages 16 in response thereto. As may be appreciated, the network interface 22 handles basic network communications, and also can perform functionality necessary to receive a request, authenticate the request, authorize the received request with the CMS 12, forward the authorized request to the CMS 12, receive a served page 16 from the CMS 12, perform post serve handling, and the like.

The network interface 22 itself may be any appropriate interface without departing from the spirit and scope of the present invention. For example, the network interface 22 may be based on MICROSOFT ASP.NET HTTP runtime software as developed and marketed by MICROSOFT Corporation of Redmond, Wash., USA. Inasmuch as the network interface 22 is known or should be apparent to the relevant public, such network interface 22 need not be described in detail herein except as set forth.

Connected Templates

Figure 3:
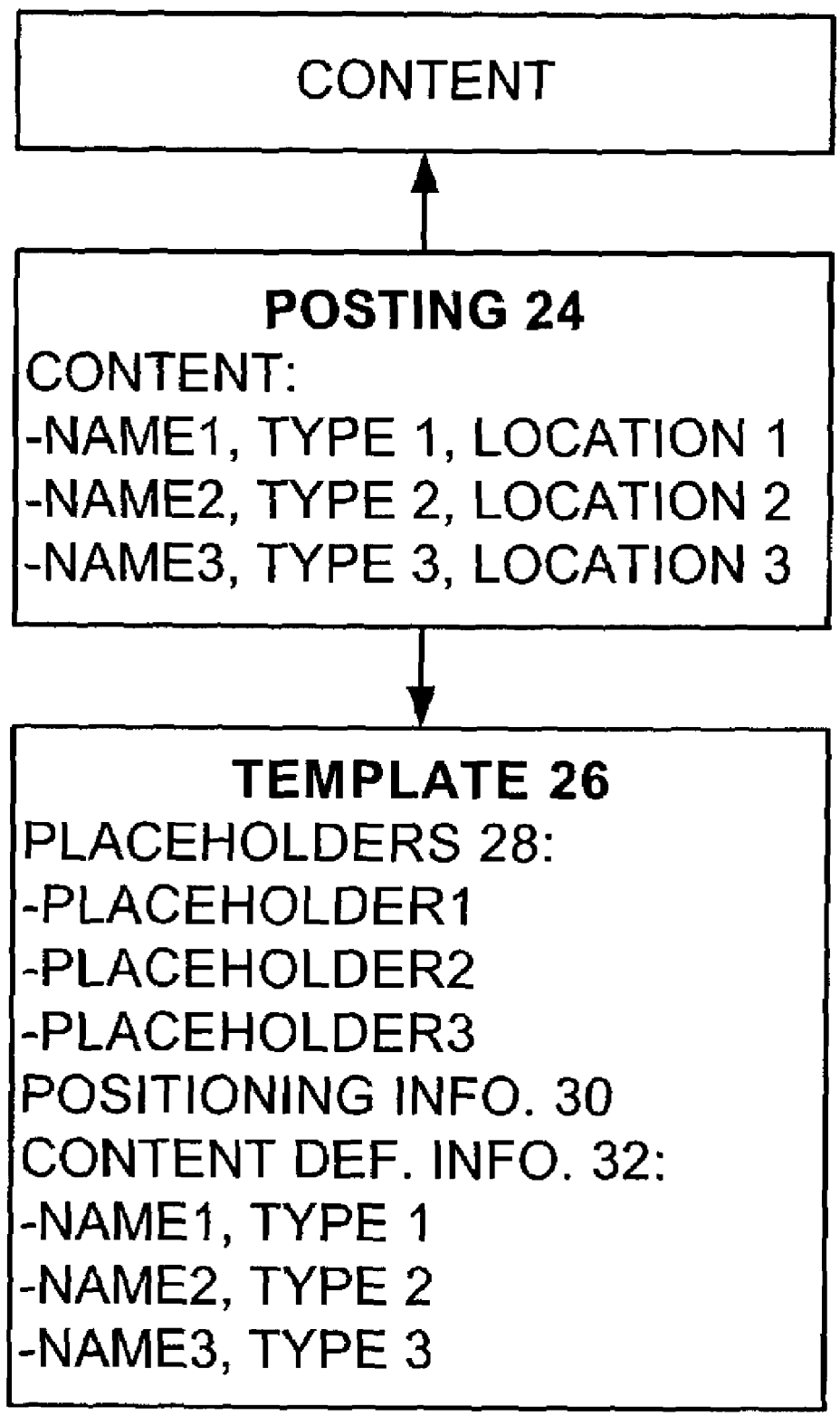
FIG. 3 is a block diagram showing a prior art arrangement of a posting and template, where the template includes content definition information therein.

As may be appreciated, and turning now to FIG. 2 and FIG. 3, each page 16 is stored within the content database 20 of the CMS 12 as a posting 24 with a pre-defined address such as a Universal Resource Locator (URL). Accordingly, a page 16 may be located within the content database 20 based on such URL.

Typically, and as seen, each posting 24 describes each piece of content to be displayed in the corresponding page 16. In particular, for each piece of content, the posting sets forth a descriptive name, a content type, and a location where the content is stored. The descriptive name is the name by which other items are expected to recognize the content. The content type is of course the type of the content, and may be any type, such as for example a text type, a picture type, a stream type, a binary type, etc. The content location may be the content database 20 or another location. Notably, a piece of content as described by the posting 24 may be a static piece of content that is merely retrieved, or may be a dynamic piece of content that must be requested from and generated by a content source.

Significantly, the posting 24 is not in itself viewable, at least in any aesthetically pleasing manner. Thus, the posting 24 points to and is typically bound to a particular template 26 by which at least a portion of the content of the posting 24 is to be viewed. As was previously set forth the template 26 is a framework to control the way that the content referenced by the posting 24 is to be presented and manipulated. Typically, the template 26 includes for each piece of content to be displayed a placeholder 28, where the piece of content corresponding to the placeholder 28 is set forth by the posting 24. In addition, the template 26 may include other content, such as for example a header, a footer, a navigation control, etc. Notably, a particular template 26 may be employed to view multiple postings 24, and may not necessarily display each piece of content described by a posting 24.

The template 26 specifies for each placeholder 28 therein positioning information 30 describing where the corresponding piece of content is to be displayed. In the prior art as seen in FIG. 3, the template 26 also specified for each placeholder 28 content definition information 32 including, for example, a name and a type of content to be placed in the placeholder 28, such as a picture, text, etc.

As was set forth above, for each placeholder 28 in the template 26 as named according to the content definition information 32 thereof, the posting 24 should refer to a correspondingly named piece of content. Thus, and again, the 'title' placeholder 28 of the template 26 is to be populated with 'title' content as specified within the posting 24 and the 'title' content is of a type specified for the 'title' placeholder 28. Similarly, and again, the 'description' placeholder 28 of the template 26 is to be populated with 'description' content as specified within the posting 24 and the 'description' content is of a type specified for the 'description' placeholder 28.

Specifying the content definition information 32 in the template 26 as in FIG. 3, however, is problematic in the event that a posting 24 is to be viewable according to more than one template 26. In particular, care must be taken that each template 26 employed to view the posting 24 uses a common naming and typing schema for naming and typing placeholders therein. If not, a posting 24 pointing to 'summary' content of type text can be viewed according to a first template 26 with a 'summary' placeholder 28 of type text, but cannot be properly viewed according to a second template 26 with a 'sum' placeholder 28 of type text, or according to a third template 26 with a 'summary' placeholder 28 of type picture. As should now be appreciated, in the former case a name mismatch is present, while in the latter case a type mismatch is present. Of course, other varieties of mismatches can occur.

Figure 4:
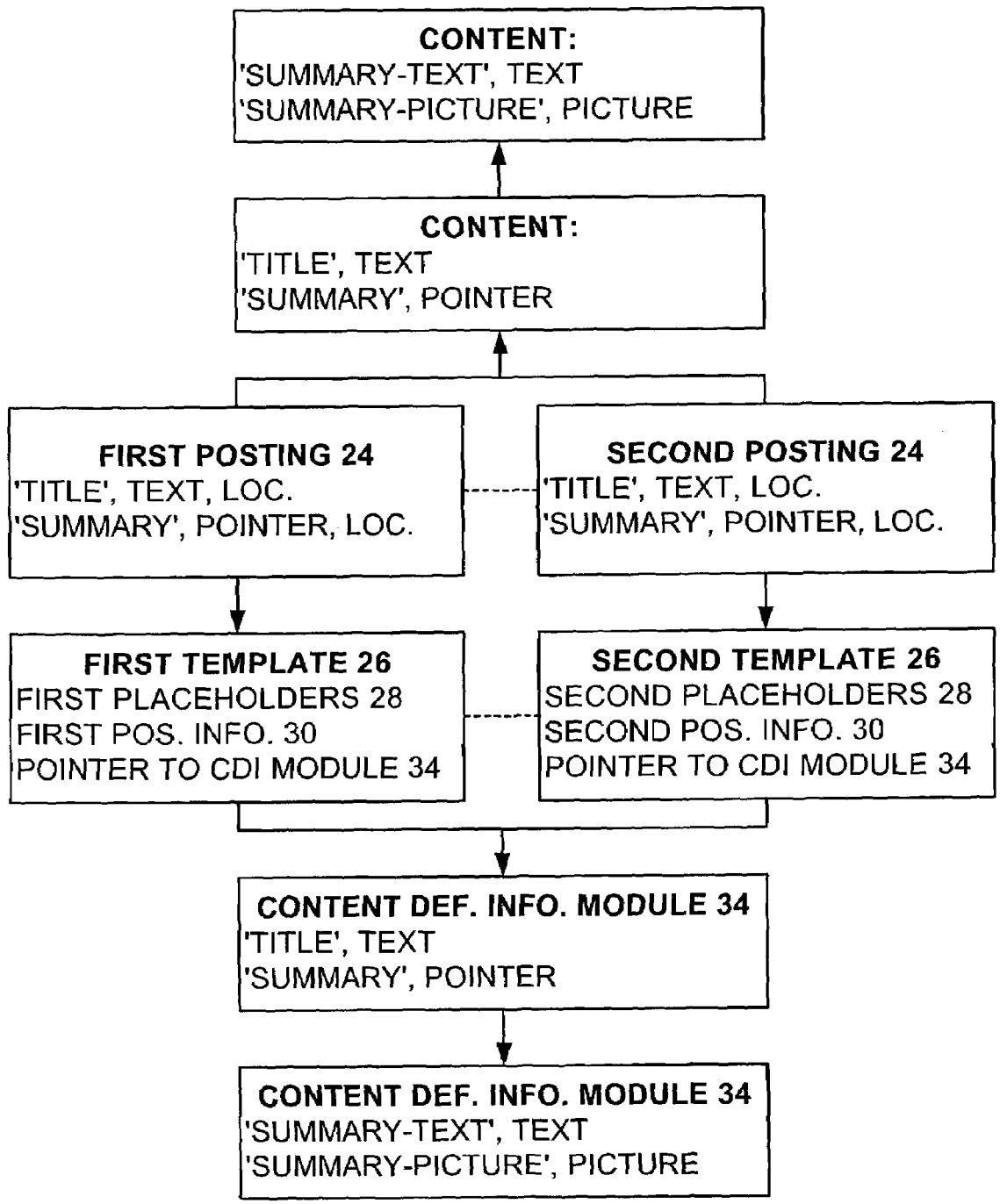
FIG. 4 is a block diagram showing an arrangement of connected postings and templates in accordance with one embodiment of the present invention, where each template points to a shared content definition information module.

Accordingly, and in one embodiment of the present invention, and turning now to FIG. 4, the content definition information 32 that was previously associated with a first template 26 is now in a distinct content definition information (CDI) module 34 that is separate from the first template 26, but that is pointed to by such first template 26. Moreover, and also in one embodiment of the present invention, a second template 26 may also point to the same CDI module 34 as may any number of additional templates 26. Thus, and as also seen in FIG. 4, the posting 24 that is to be viewed according to the first template 26 may also be viewed according to the second template 26 or any of the additional templates 26 that point to the CDI module 34. Significantly, since all of such templates 26 share or are common to the CDI module 34, and since the CDI module 34 has the content information relevant to the content of the posting 24, none of the common templates 26 can exhibit a name or type mismatch or any other mismatch with regard to the posting 24.

As was mentioned above, a posting 24 typically points to and is therefore bound to a particular template 26. Accordingly, the posting 24 when served to a requesting user is viewed according to the bound-to template 26. If it is the case that a first posting 24 is indeed bound to a first template 26, then, it is to be understood that such first posting 24 cannot itself be viewed according to a second template 26. Instead, a second, connected posting 24 bound to the second template 26 must be employed. As may be appreciated, the first and second postings 24 are connected inasmuch as both point to the same content, although it is not absolutely necessary that such first and second postings 24 point to content in an identical manner. Note that the second posting 24 may be generated from the first posting 24 on demand, i.e., in response to a user request for the first posting 24 viewed according to the second template 26, or may be generated along with the first posting 24 prior to such a user request.

In one embodiment of the present invention, and as a consequence of having a CDI module 34 separate from a template 26 but pointed thereto, the content definition information in such module 34 can be richer in that such content definition information can point to other CDI modules 34 for further content definition information, as is seen in FIG. 4. Thus, and as an example, a posting 24 can point to a piece of content named 'summary' in the content database 20 or elsewhere, where the 'summary' piece of content is an object that includes a pointer to a 'summary-text' object with text content relating to the 'summary' object and a 'summary-picture' object with picture content relating to the 'summary object.

Correspondingly, the CDI module 34 pointed to by the template 26 to which the posting 24 is bound may be a first CDI module 34 that includes therein the content definition information corresponding to the 'summary' object, where such content definition information in the first CDI module 34 points to a second CDI module 34 that includes therein the content definition information corresponding to the 'summary-text' object and the content definition information corresponding to the 'summary-picture' object. As a result, a first template 26 that points to the first CDI module 34 may access the 'summary-text' content definition information from the second CDI module 34 for a corresponding placeholder 28, and a second template 26 that also points to the first CDI module 34 may access the 'summary-picture' content definition information from the second CDI module 34 for a corresponding placeholder 28. As should now be appreciated, any number of levels of pointing CDI modules 34 may be employed without departing from the spirit and scope of the present invention.

As should also now be appreciated, in the present invention, there is an implicit correspondence between the content pointed to by a first posting 24 and the CDI module 34 pointed to by the template 26 to which the first posting 24 is bound. Thus, as long as a second posting 24 connected to the first posting 24 also points at a template 26 that in turn points to the same CDI module 34, content definition mismatches should not occur.

CONCLUSION

Although the present invention is disclosed primarily in terms of a CMS 12, it is to be appreciated that such invention can be used by any other system that serves content. Accordingly, the present invention should not be limited to use in connection with the CMS 12, but should be interpreted to be employable by any such other system as well.

Similarly, although the present invention is disclosed primarily in terms of a template 26 with all template-related information, it is to be appreciated that such invention can be used in connection with a template system having multiple elements, each with a portion of the template-related information. Thus, and for example, the template system could be based on a template gallery construct that includes basic template information and points to the CDI module 34 and that also points to an item with template positioning information. Accordingly, the present invention should not be limited to use in connection with any particular kind of template or template system.

The programming necessary to effectuate the processes performed and structures created in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful CMS system 10 or other system that allows the content of a posting to be viewed according to multiple connected templates that share a common content definition. It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A data system for serving a set of pieces of content to a user, comprising:

a memory; and a data structure stored on said memory, said data structure comprising:

a first posting corresponding to the set of pieces of content to be served, the first posting including a description of each piece of content including a name of the piece of content, a type of the piece of content, and a location of the piece of content;

a first template pointed to by the first posting, the first posting for being presented to the user according to the first template such that the set of pieces of content are to be viewed in a first manner, the first template including a placeholder within which each piece of content is to be presented, and positioning information setting forth a layout position for each placeholder;

a second posting corresponding to the set of pieces of content to be served, the second posting including a description of each piece of content including a name of the piece of content, a type of the piece of content, and a location of the piece of content;

a second template pointed to by the second posting, the second posting for being presented to the user according to the second template such that the set of pieces of content are to be viewed in a second manner, the second template including a placeholder within which each piece of content is to be presented, and positioning information setting forth a layout position for each placeholder; and a content definition information (CDI) module being separate from but shared by and pointed to by both the first and second templates, the CDI module including therein content definition information for each placeholder of the first and second templates including the name and type of the piece of content corresponding to the placeholder, such name and type of the piece of content matching a corresponding name and type of piece of content as set forth in each of the first and second postings.

2. The data system of claim 1 comprising a data structure further having:

a third posting corresponding to the set of pieces of content to be served, the third posting including a description of each piece of content including a name of the piece of content, a type of the piece of content, and a location of the piece of content; and a third template pointed to by the third posting, the third posting for being presented to the user according to the third template such that the set of pieces of content are to be viewed in a third manner, the third template including a placeholder within which each piece of content is to be presented, and positioning information setting forth a layout position for each placeholder;

the CDI module being separate from but shared by and pointed to by all of the first, second, and third templates, the CDI module including therein content definition information for each placeholder of the first, second, and third templates including the name and type of the piece of content corresponding to the placeholder, such name and type of the piece of content matching a corresponding name and type of piece of content as set forth in each of the first, second, and third postings.

3. The data system of claim 1 wherein the data structure further includes a content object pointed to by the first posting, the content object including a description of an additional piece of content including a name, type, and location thereof, and wherein the CDI module is a first CDI module, the data structure further having a second CDI module separate from but pointed to by the first CDI module, the second CDI module including therein content definition information for a placeholder of the first template including the name and type of the additional piece of content corresponding to the placeholder, such name and type of the additional piece of content matching the corresponding name and type of the additional piece of content as set forth in the content object.

4. A computer-readable medium having stored thereon a data structure to be employed by a data system for serving a set of pieces of content to a user, the data structure having:

a first posting corresponding to the set of pieces of content to be served, the first posting including a description of each piece of content including a name of the piece of content, a type of the piece of content, and a location of the piece of content;

a first template pointed to by the first posting, the first posting for being presented to the user according to the first template such that the set of pieces of content are to be viewed in a first manner, the first template including a placeholder within which each piece of content is to be presented, and positioning information setting forth a layout position for each placeholder;

a second posting corresponding to the set of pieces of content to be served, the second posting including a description of each piece of content including a name of the piece of content, a type of the piece of content, and a location of the piece of content;

a second template pointed to by the second posting, the second posting for being presented to the user according to the second template such that the set of pieces of content are to be viewed in a second manner, the second template including a placeholder within which each piece of content is to be presented, and positioning information setting forth a layout position for each placeholder; and a content definition information (CDI) module being separate from but shared by and pointed to by both the first and second templates, the CDI module including therein content definition information for each placeholder of the first and second templates including the name and type of the piece of content corresponding to the placeholder, such name and type of the piece of content matching a corresponding name and type of piece of content as set forth in each of the first and second postings, wherein the second posting is generated from the first posting in response to a request for the first posting viewed according to the second template.

5. The medium of claim 4 wherein the data structure further has:

a third posting corresponding to the set of pieces of content to be served, the third posting including a description of each piece of content including a name of the piece of content, a type of the piece of content, and a location of the piece of content; and a third template pointed to by the third posting, the third posting for being presented to the user according to the third template such that the set of pieces of content are to be viewed in a third manner, the third template including a placeholder within which each piece of content is to be presented, and positioning information setting forth a layout position for each placeholder;

the CDI module being separate from but shared by and pointed to by all of the first, second, and third templates, the CDI module including therein content definition information for each placeholder of the first, second, and third templates including the name and type of the piece of content corresponding to the placeholder, such name and type of the piece of content matching a corresponding name and type of piece of content as set forth in each of the first, second, and third postings.

6. The medium of claim 4 wherein the data system is for serving a page of the set of pieces of content to a user, the data structure having:
   a first posting corresponding to the set of pieces of content to be served, the first posting including a description of each piece of content including a name of the piece of content, a type of the piece of content, and a location of the piece of content;
   a first template pointed to by the first posting, the first posting for being presented to the user according to the first template such that the set of pieces of content are to be viewed as a first page, the first template including a placeholder within which each piece of content is to be presented, and positioning information setting forth a layout position for each placeholder; and
   a content definition information (CDI) module separate from but pointed to by the first template, the CDI module including therein content definition information for each placeholder of the first template including the name and type of the piece of content corresponding to the placeholder, such name and type of the piece of content matching a corresponding name and type of piece of content as set forth in the first posting.

7. The medium of claim 4 wherein the data structure further includes a content object pointed to by the first posting, the content object including a description of an additional piece of content including a name, type, and location thereof, and wherein the CDI module is a first CDI module, the data structure further having a second CDI module separate from but pointed to by the first CDI module, the second CDI module including therein content definition information for a placeholder of the first template including the name and type of the additional piece of content corresponding to the placeholder, such name and type of the additional piece of content matching the corresponding name and type of the additional piece of content as set forth in the content object.

* * * * *